(12) United States Patent
Graβhoff et al.

(10) Patent No.: US 7,426,430 B2
(45) Date of Patent: Sep. 16, 2008

(54) CONTROL UNIT FOR ACTIVATING AN OCCUPANT PROTECTION MEANS IN A MOTOR VEHICLE AND METHOD FOR MONITORING THE PROPER FUNCTIONING OF A CONTROL UNIT PREFERABLY OF THIS TYPE

(75) Inventors: Helge Graβhoff, Regensburg (DE); Koutaro Machidera, Atsugi (JP)

(73) Assignee: Siemens Aktiengesellschaft, Munich (DE)

( * ) Notice: Subject to any disclaimer, the term of this patent is extended or adjusted under 35 U.S.C. 154(b) by 637 days.

(21) Appl. No.: 10/535,126

(22) PCT Filed: Nov. 12, 2003

(86) PCT No.: PCT/DE03/03737

§ 371 (c)(1), (2), (4) Date: Jun. 7, 2005

(87) PCT Pub. No.: WO2004/043737

PCT Pub. Date: May 27, 2004

(65) Prior Publication Data

US 2006/0064217 A1   Mar. 23, 2006

(30) Foreign Application Priority Data

Nov. 14, 2002   (DE) ............... 102 52 990

(51) Int. Cl.
*G06F 11/00*   (2006.01)
*G06F 19/00*   (2006.01)

(52) U.S. Cl. ............... 701/45; 701/1; 701/47; 180/271

(58) Field of Classification Search ............ 701/45, 701/46, 471; 708/531; 180/271, 179; 123/351
See application file for complete search history.

(56) References Cited

U.S. PATENT DOCUMENTS 3,659,089 A * 4/1972 Payne et al. ............. 708/531

(Continued)

FOREIGN PATENT DOCUMENTS

DE   37 00 986 A1   7/1988

(Continued)

*Primary Examiner*—Tan Q Nguyen
(74) *Attorney, Agent, or Firm*—Laurence A. Greenberg; Werner H. Stemer; Ralph E. Locher

(57) ABSTRACT

The invention relates to a control unit for activating an occupant protection means in a motor vehicle and to a method for monitoring the proper functioning of a control unit preferably of this type. To this end, the control unit comprises a first and a second arithmetic unit (R1, R2) as well as an activating unit (AE). A number of logical AND gates (AND1, AND2; AND3) are connected on the input side to the clock signals (clk1, clk2, clk3) of the arithmetic units (R1, R2) respectively assigned thereto or to the activating unit (AE). The signal output of each logical AND gate (AND1, AND2; AND3) is fed to a respectively assigned pulse count comparator unit (PZVE1, PZVE2) whose respective signal output is, in turn, connected to an input of a respectively assigned resetter (RES1, RES2). A resetter (RES1, RES2) of each arithmetic unit (R1, R2) always resets the respective other arithmetic unit (R1, R2) when the pulse count comparator unit (PZVE1, PZVE2) respectively assigned thereto detects an inadmissible number of pulses per unit of time in the output signal (clk13, clk23, clk23) of the respective AND gate (AND1, AND2; AND3).

13 Claims, 4 Drawing Sheets

U.S. PATENT DOCUMENTS

| | | | |
|---|---|---|---|
| 4,501,284 A * | 2/1985 | Kuno et al. | 123/352 |
| 4,881,227 A | 11/1989 | Bühren | |
| 5,522,040 A | 5/1996 | Hofsäss et al. | |
| 5,957,988 A * | 9/1999 | Osajda et al. | 701/45 |
| 6,848,064 B2 | 1/2005 | Bolz | |
| 2004/0153886 A1 | 8/2004 | Schumacher et al. | |

FOREIGN PATENT DOCUMENTS

| | | |
|---|---|---|
| DE | 39 26 377 A1 | 2/1991 |
| DE | 40 04 709 C2 | 8/1991 |
| DE | 40 39 355 A1 | 6/1992 |
| DE | 100 30 991 A1 | 1/2002 |
| DE | 100 56 408 C1 | 3/2002 |
| DE | 100 49 440 A1 | 4/2002 |
| DE | 101 51 012 A1 | 4/2003 |
| EP | 0 575 854 A2 | 12/1993 |
| GB | 2 241 361 A | 8/1991 |
| JP | 11 330 931 A | 11/1999 |

* cited by examiner

FIG 5

|       | 1 | 2 | 3 | 4 | 5 | 6 | 7 | 8 |
|-------|---|---|---|---|---|---|---|---|
| clk1  | 0 | 0 | 0 | 0 | x | x | x | x |
| clk2  | 0 | 0 | x | x | 0 | 0 | x | x |
| clk3  | 0 | x | 0 | x | 0 | x | 0 | x |
| clk13 | 0 | x | 0 | x | x | x | x | x |
| clk12 | 0 | 0 | x | x | x | x | x | x |
| clk23 | 0 | x | x | x | 0 | x | x | x |
| R1    | 0 |   |   |   |   |   |   | x |
| R2    | 0 |   |   |   |   |   |   | x |
| AE    | 0 |   | 0 |   | 0 |   |   | x |

CONTROL UNIT FOR ACTIVATING AN OCCUPANT PROTECTION MEANS IN A MOTOR VEHICLE AND METHOD FOR MONITORING THE PROPER FUNCTIONING OF A CONTROL UNIT PREFERABLY OF THIS TYPE

BACKGROUND OF THE INVENTION

Field of the Invention

The invention relates to a control unit for activating an occupant protection means in a motor vehicle and to a method for monitoring the proper functioning of a control unit preferably of this type. To this end, the control unit comprises a first arithmetic unit, a second arithmetic unit and an activating unit which are respectively clocked asynchronously relative to one another. The control unit also comprises a first and a second logical AND gate. The first and the second arithmetic unit comprise respectively a pulse count comparator unit and a resetter.

The clock signal of the arithmetic unit respectively assigned thereto, as well as the clock signal of the activating unit, are fed to each logical AND gate on the input side. The signal output of each logical AND gate is fed to the input of the pulse count comparator unit of each arithmetic unit and the output of the pulse count comparator unit to the input of the respectively relevant resetter of an arithmetic unit.

The resetter of each arithmetic unit is connected to the reset input of the respective other arithmetic unit so that the relevant resetter resets the respective other arithmetic unit when the relevant pulse count comparator unit detects an inadmissible number of pulses per unit of time in the output signal of the AND gate respectively connected thereto.

The prior art monitors functional processes in arithmetic units with the aid of circuits and, where faults are detected in the functional processes, resets the faulty arithmetic units. In the publications DE 100 56 408 C1, DE 100 30 991 A1, DE 100 49 440 A1 and DE 40 39 355 A1 a so-called watchdog circuit is used for this purpose, said watchdog circuit evaluating the pulses emitted by the arithmetic unit in terms of their pulse length, interval length or the number of pulses per unit of time.

In many control systems today, a second arithmetic unit is provided in addition to a first arithmetic unit. As a fail-safe arithmetic unit, the second arithmetic unit serves here principally to monitor the proper functioning of the first arithmetic unit and, in the event of the failure thereof, possibly to take over at least partially the arithmetic and control functions of the first arithmetic unit.

The use of such fail-safe arithmetic units is especially important in connection with a first main arithmetic unit in control systems whose failure would entail at least the risk of injury to persons. Such a safety-relevant control system is for example the control unit for controlling an occupant protection means in a motor vehicle. There, the main arithmetic unit calculates the start time for activating the appropriate occupant protection means which, in the event a collision accident, offers a vehicle occupant the best possible protection against injuries. After calculating the best start time, the main arithmetic unit releases activation of the appropriate occupant protection means, for example of a driver airbag.

Even in the event of just a partial failure of the computing capacity of the main arithmetic unit, activation of the appropriate occupant protection means at the correct time by the control unit can no longer be guaranteed. For this reason, the decision-making functionality of the first arithmetic unit must be taken over by the second arithmetic unit, the fail-safe arithmetic unit. To this end, the fail-safe arithmetic unit must first detect a possible malfunction of the first arithmetic unit, in order in a second step to reset or even fully disconnect the first arithmetic unit and, where applicable, take over at least partially the functions of the first arithmetic unit.

Such a two-computer system in a safety-relevant application in a motor vehicle is described, for example, in the German unexamined patent application DE 37 00 986 A1. The processors shown there monitor one another on an equal footing. To this end, each arithmetic unit outputs a watchdog signal 33, 37, which is checked in the respective other arithmetic unit by means of a watchdog detection 14, 22. If each arithmetic unit receives from the respective other arithmetic unit a defective watchdog signal 33, 35, then the respective arithmetic unit functioning properly outputs a reset signal 40, 36 to the faulty other arithmetic unit.

Similar control systems, each with two arithmetic units, in safety critical applications in motor vehicles, are also known from printed publications DE 101 51 012 A1 and DE 40 04 709 C2, the reciprocal monitoring of the two arithmetic units also being carried out here with the aid of one watchdog detection in each arithmetic unit.

The reciprocal monitoring of the correct functioning of arithmetic units by such a watchdog circuit is, however, often only very slow. Particularly in the case of occupant protection systems, however, it is very important to detect a malfunction of an arithmetic unit within a control unit of an occupant protection system very quickly and reliably in order to be able to initiate action immediately to limit possible risks to a vehicle occupant.

SUMMARY OF THE INVENTION

The object of the present invention is therefore to create the necessary technical preconditions in order to establish very rapid detection of the malfunctioning of at least one arithmetic unit within a control unit of an occupant protection means for a motor vehicle.

The object is achieved in a control unit according to claim 1.

The control unit according to the invention has, in addition to the main arithmetic unit, the first arithmetic unit, a fail-safe arithmetic unit, the second arithmetic unit, as well as an activating unit for activating the occupant protection means, for example an airbag. The first arithmetic unit, the second arithmetic unit and the activating unit are respectively clocked asynchronously relative to one another by an internal or external clock-pulse generator.

The first arithmetic unit comprises a first pulse count comparator unit and a first resetter, the second arithmetic unit a second pulse count comparator unit and a second resetter. Furthermore, the control unit has a first and a second logical AND gate respectively assigned to the first or second arithmetic unit.

Both the clock signal of the first arithmetic unit and the clock signal of the activating unit are fed to the input of the first logical AND gate, whereas its output is connected to the input of the second pulse count comparator unit. The output of the second pulse count comparator unit is connected to an input of the second resetter whose output is in turn fed to the reset input of the first arithmetic unit.

The configuration of the first logical AND gate of the control unit is such that the second resetter resets the first arithmetic unit by outputting a reset signal if the second pulse count comparator unit detects an inadmissible number of pulses per unit of time in the output signal of the first AND gate.

The configuration of the second logical AND gate follows, by analogy, the configuration of the first logical AND gate, whereby the first arithmetic unit is replaced by the second arithmetic unit and the first pulse count comparator unit is likewise replaced by the second, the first resetter by the second resetter and the reset input of the first arithmetic unit by the reset input of the second arithmetic unit.

Consequently, the configuration of the second AND gate is such that the first resetter resets the second arithmetic unit by outputting a reset signal if the first pulse count comparator unit detects an inadmissible number of pulses per unit of time in the output signal of the second AND gate.

A pulse count comparator unit of an arithmetic unit of the control unit according to the invention is deemed in the context of the invention described here to be a functional unit which, for example, counts a number of high levels per unit of time in a pulse sequence and compares this with a previously stipulated comparative value. Depending on this comparison, the pulse count comparator unit can output different control signals.

Of course, a pulse count comparator unit could alternatively also count a number of low levels or a number of changes of level per unit of time in a pulse sequence.

In an advantageous development, the control unit has a first and a second logical OR gate, the second OR gate being connected on the input side to the output of the second resetter and on the output side to the reset input of the first arithmetic unit and the first OR gate being connected correspondingly on the input side to the first resetter and on the output side to the reset input of the second arithmetic unit. This offers the advantage that further reset signals of other circuit elements of the control unit can be fed to a respective other input of the logical OR gates so that an arithmetic unit can be reset not only by the decision of the respective other arithmetic unit but also by a further decision of a further functional unit of the control unit.

In a further advantageous embodiment, the first resetter of the first arithmetic unit or the second resetter of the second arithmetic unit is connected to a reset input of the activating unit. In this way, the first resetter or the second resetter can, where a malfunction of the second or first arithmetic unit is identified, reset not only the respective other arithmetic unit but also the activating unit. This offers an additional safeguard with regard to a correct functioning of the occupant protection system since, in the event of a malfunction of at least one of the two arithmetic units, the activating unit will also safely be disabled. A possibly dangerous activation of the occupant protection means will safely be prevented by this means.

Consequently, the control unit possesses a particularly high level of safety above all when the two resetters of the arithmetic unit are connected to a reset input of the activating unit so that both arithmetic units can, where applicable, reset the activating unit. It is also advantageous here if the control unit has a third logical OR gate which on the input side receives the signals of the resetters of both arithmetic units and on the output side is connected to the reset input of the activating unit.

In a further advantageous embodiment of the invention, the control unit has a third AND gate to which on the input side the clock signals of the first and second arithmetic unit are fed and whose signal output is fed to both the first and the second pulse count comparator unit of the first or second arithmetic unit. If the first or the second pulse count comparator unit identifies a defective output signal of the third AND gate, then it reports the fault to the resetter respectively assigned to it, which resetter resets the respective other arithmetic unit and, where applicable, also the activating unit.

It is also advantageous if the control unit has a so-called first watchdog circuit. For this purpose, a first watchdog input of the activating unit is connected to a watchdog output of the first arithmetic unit and an arithmetic unit resetting output of the activating unit is connected directly or indirectly to the first arithmetic unit. If the activating unit identifies a fault in the watchdog signal of the watchdog output of the first arithmetic unit, then the activating unit outputs an arithmetic unit resetting signal directly or indirectly to the first arithmetic unit. Such a redundant fail-safe circuit in the form of a first watchdog circuit additionally improves the safe disabling of a first arithmetic unit operating defectively within the control unit of the occupant protection system.

An analogous second watchdog circuit for the resetting of a defective second arithmetic unit by the activating unit provides additional safety, particularly where the second arithmetic unit contributes equally to the functioning of the safety system.

A method suitable for achieving the object is specified in the independent claim 7.

The method according to the invention serves to monitor the proper functioning of a control unit according to the invention for activating an occupant protection means in a motor vehicle. The sequence of such an inventive method has already been described sufficiently with regard to the features of an inventive device, the functional relationship of which features has been explained hereinabove. In order to avoid repetition at this point, only those features of the inventive method which go beyond the scope of what has already been outlined will be described here.

For example, the manner in which the clock signals of the two arithmetic units and of the activating unit are combined to form signals linked logically to one another in different ways is immaterial to a method according to the invention. In the inventive device described above, such a logical connecting function is achieved by means of logical AND gates which—like the OR gates also disclosed—can be fashioned both as electrical components and as program sequences within a microprocessor. Rather, it is crucial to a method according to the invention that a logical operation of the mentioned clock signals be carried out in such a way that a pulse sequence is generated which, by counting the individual pulses and comparing the determined value with a setpoint value, can subsequently be evaluated to assess whether one of the clocked functional units of the control unit containing them is operating functionally correctly or not.

To this end, the functional units identified as defective are advantageously reset at least once so that a functional unit operating defectively is given the opportunity through a restart to achieve a planned operational status. If such a proper operational status cannot be brought about after a single or multiple resetting of the functional unit, then at least the faulty part of the control device will be deactivated and, if possible, replaced by another functional unit of the control device. Where applicable, the entire control unit will be deactivated.

The partial or complete deactivation of the control device of the occupant protection system is then displayed accordingly to a vehicle occupant, for example through the flashing of a warning light, usually in the vehicle dashboard.

BRIEF DESCRIPTION OF THE DRAWING

The invention will be described below with reference to several exemplary embodiments, in which:

FIG. 5 shows a schematic decision matrix for resetting the arithmetic units (R1, R2) or the activating unit (AE) of a control unit according to the invention.

DESCRIPTION OF THE PREFERRED EMBODIMENTS

Figure 1:
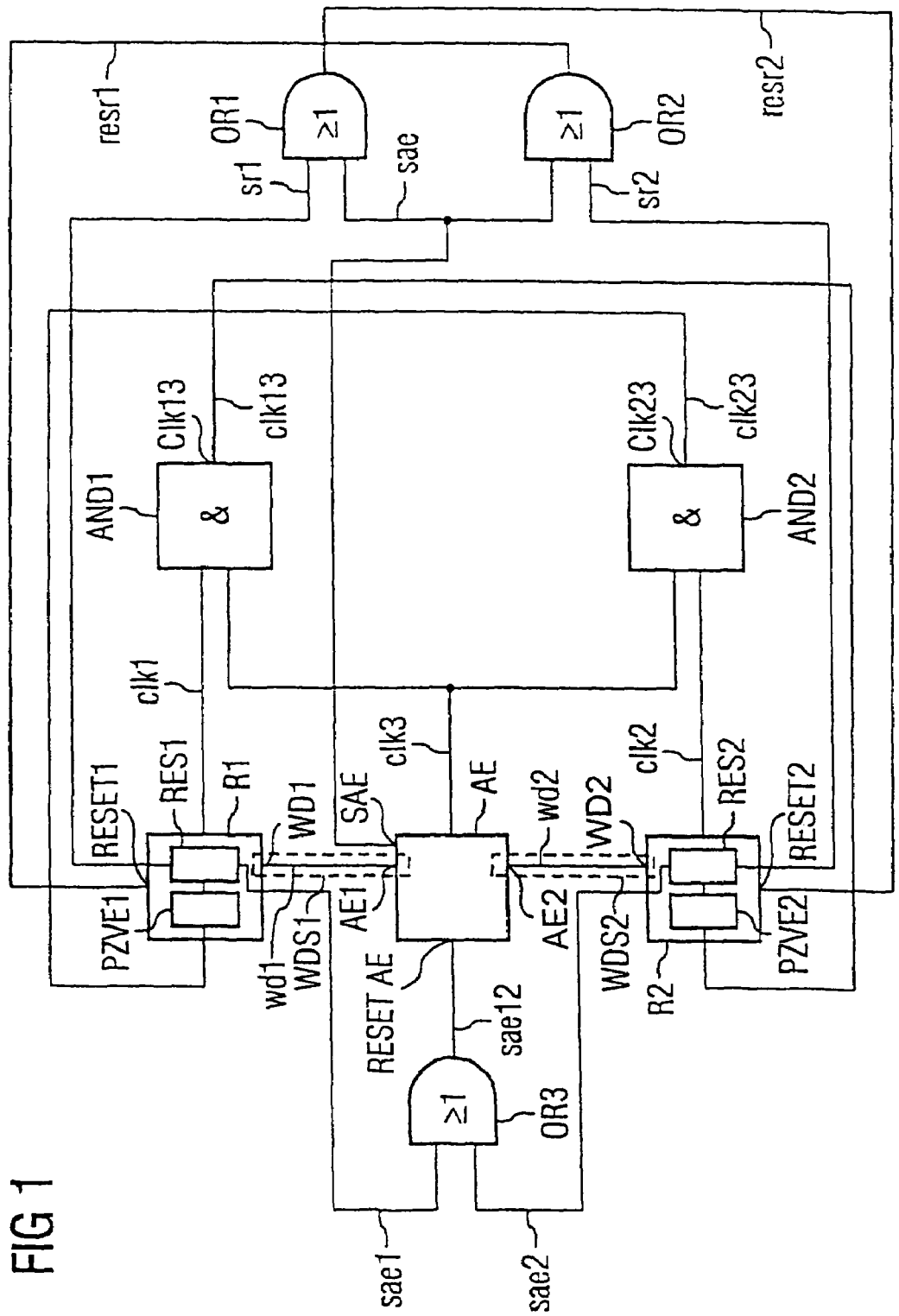
FIG. 1 shows a control unit according to the invention comprising two AND gates (AND1, AND2)

FIG. 1 shows a control unit according to the invention, comprising a first and second arithmetic unit R1, R2 and an activating unit AE as well as a first and a second AND gate AND1, AND2 and a first, second and third OR gate OR1, OR2, OR3.

The clock signal clk1 of the first arithmetic unit R1 is fed to the first signal input of the first AND gate AND1. The clock signal clk3 of the activating unit AE is fed to the second signal input of the first AND gate AND1. A logical sum signal clk13 of the two clock signals clk1, clk3 fed on the input side is present at the signal output of the first AND gate, which logical sum signal is fed to a pulse count comparator unit PZVE2 of the second arithmetic unit R2. The signal output of the second pulse count comparator unit PZVE2 is connected to a second resetter RES2 within the second arithmetic unit R2. The second resetter RES2 is connected on the output side to a signal input of the second OR gate OR2. The signal output of the second OR gate OR2 is in turn connected to the first reset input RESET1 of the first arithmetic unit R1.

The second AND gate AND2 is also configured similarly to the configuration of the first AND gate AND1. The clock signal clk2 of the second arithmetic unit R2 is fed to the first signal input of the second AND gate AND2, likewise the clock signal clk3 of the activating unit AE is fed to its second signal input. The output signal clk23 of the second logical AND gate AND2 is a logical sum signal of the two clock signals clk2 and clk3 fed on the input side and is fed to the first pulse count comparator unit PZVE1 of the first arithmetic unit R1. The first pulse count comparator unit PZVE1 directs an output signal to the first resetter RES1 which is connected on the output side to the signal input of the first OR gate OR1. The signal output of the first OR gate OR1 is fed to the reset input RESET2 of the second arithmetic unit R2.

A respective second signal output of the first resetter RES1 or of the second resetter RES2 is connected respectively to a signal input of a third OR gate OR3. The signal output of the third OR gate OR3 is connected to a reset input RESETAE of the activating unit AE.

Furthermore, a first watchdog signal wd1 is fed from a watchdog output WD1 of the first arithmetic unit R1 to a first watchdog input AE1 of the activating unit AE. Analogously, a second watchdog signal wd2 is also fed from a second watchdog output WD2 of the second arithmetic unit R2 to a second watchdog input AE2 of the activating unit AE.

Finally, an arithmetic unit resetting output SAE of the activating unit AE is connected to the respective second signal inputs of the first OR gate OR1 and of the second OR gate OR2.

Figure 3:
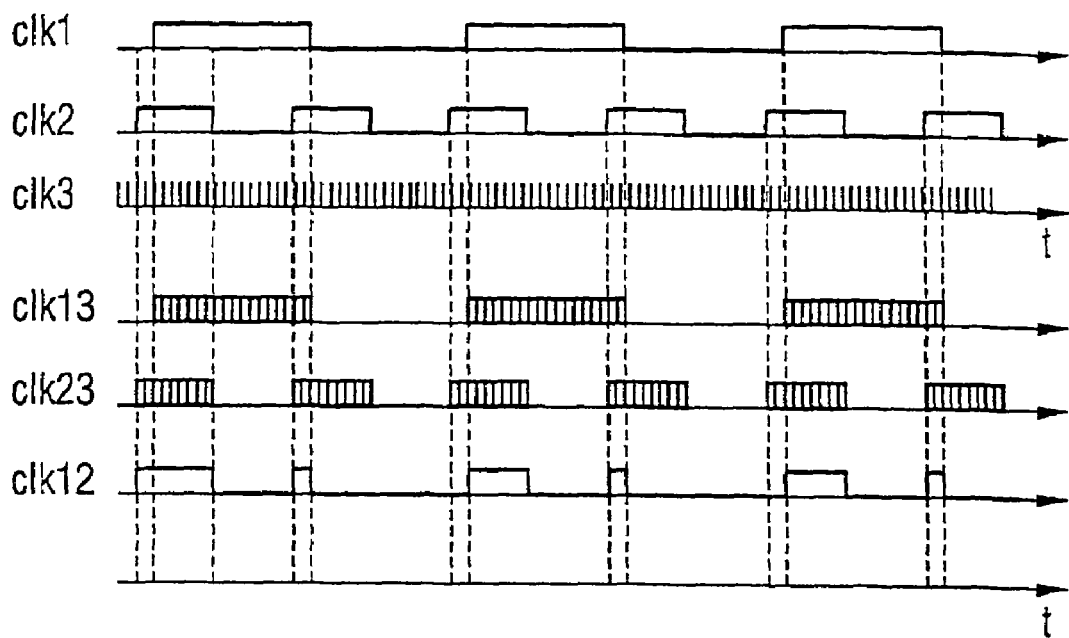
FIG. 3 shows a schematic runtime diagram of the clock signals (clk1, clk2, clk3) of the first and of the second arithmetic unit (R1, R2) and of the activating unit (AE) and of the clock signals composed thereof (clk13, clk23, clk12) at the output of the first, second and third AND gate (AND1, AND2, AND3)

The circuit shown in FIG. 1 functions as follows:

The first AND gate AND1 generates on the output side a modified clock signal clk13 from the two clock signals fed on the input side, that of the first arithmetic unit clk1 and of the clock signal of the activating unit clk3. As shown in FIG. 3, the output signal clk13 of the first AND gate AND1 has a logical high level only when the clock signals clk1 and clk3 fed on the input side simultaneously also have a logical high level. Since, in the embodiment shown in FIG. 3, the clock signal clk1 of the first arithmetic unit R1 with a clock frequency of, for example, 1 kHz has a substantially greater clock pulse period than the clock signal clk3 of the activating unit AE with a clock frequency of, for example, 50 kHz, the modified clock signal clk13 has a recurring pulse sequence with a period of the first clock signal clk1, with individual pulses within the pulse sequences having a periodicity of the clock signal clk3 of the activating unit AE.

Figure 4:
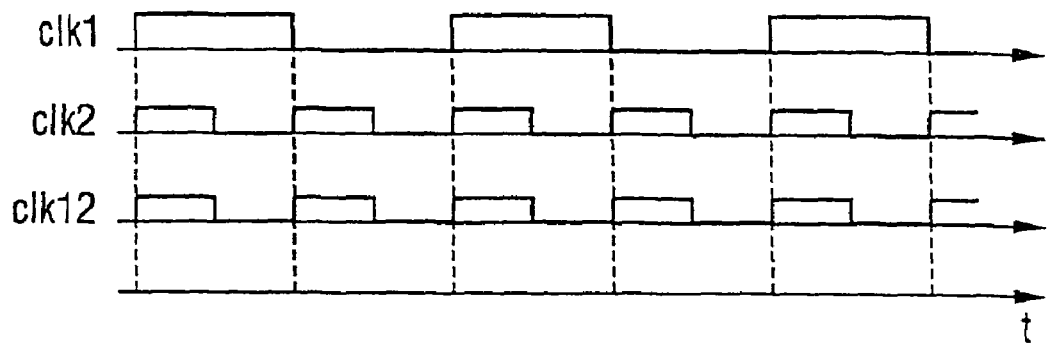
FIG. 4 shows a schematic runtime diagram of the clock signals (clk1, clk2) of the first and of the second arithmetic unit (R1, R2) and of the associated output signal (clk12) of the third AND gate (AND3) in the case of synchronization of the two arithmetic units (R1, R2)

Depending on the shift of the clock pulse periods of the two clock signals clk1 and clk3 relative to one another, the output signal clk13 of the first AND gate AND1 has a fixed number of individual pulses per period length. In the example in FIG. 3, the clock signal clk13 has for example between 49 and 50 high-level pulses per pulse-sequence period length.

Where the two clock signals clk1 and clk3 are synchronized, the number of individual pulses within a pulse sequence per unit of time would always be the same. A relevant case is shown, for example, in FIG. 4 for the two signals clk1 and clk2 with clock frequencies of, for example, 1 kHz and 2 kHz.

The second pulse count comparator unit PZVE2 of the second arithmetic unit R2 counts the number of individual pulses in the output signal clk13 of the first AND gate AND1 and compares this value with a comparative value which is stored in the second arithmetic unit R2, for example in a RAM memory. If the determined number of pulses in the output signal clk13 of the first AND gate AND1 deviates from this stored value in an inadmissible manner, then the second pulse count comparator unit PZVE2 activates the second resetter RES2 which outputs a second reset signal sr2 via the second OR gate OR2 to the reset input RESET1 of the first arithmetic unit R1. The first arithmetic unit R1 is reset electrically by this means.

In the embodiment shown in FIG. 1, the second resetter RES2 can optionally simultaneously forward a further resetting signal sae2 via the third OR gate OR3 to the activating unit AE, as a result of which the activating unit AE is also reset to its initial electrical status.

In the reset status, an occupant protection means connected to the activating unit AE can neither be controlled by the first arithmetic unit R1 nor activated by the activating unit AE.

After the resetting of the first arithmetic unit R1 and of the activating unit AE, both run through a function ramp-up, during which the full functionality of the two functional units R1 and AE within the control device of the occupant protection means is fully restored. Only when the function ramp-up of the two functional units R1 and AE has been completed successfully can the occupant protection means connected to the activating unit AE be reactivated if necessary.

If, however, the second pulse count comparator unit PZVE2 of the second arithmetic unit R2 identifies in turn a malfunction either of the first arithmetic unit R1 or of the activating unit AE from the output signal clk13 of the first AND gate AND1, then the two functional units R1 and AE are once again reset or permanently deactivated.

A permanent deactivation of the first arithmetic unit R1 or of the activating unit AE of the occupant protection means is usually displayed to the vehicle owner by means of a so-called airbag warning light in the vehicle dashboard.

The way in which the configuration of the second AND gate AND2 functions is completely analogous with the functioning of the configuration of the first AND gate AND1:

The second AND gate AND2 generates on the output side a modified clock signal clk23 from the two clock signals fed on the input side clk2 from the second arithmetic unit R2 and the clock signal clk3 from the activating unit AE. As in the case of the first AND gate AND1, the output signal clk23 of the second AND gate AND2 has a logical high level only when the clock signals fed on the input side clk2 and clk3 simultaneously also have a logical high level. Here, too, the period of the second clock signal clk2 is normally less than the period of the clock signal clk3 of the activating unit AE. Therefore, pulse sequences also occur in the output signal of the second AND gate clk23 which are modulated with the slower period of the clock signal of the second arithmetic unit clk2 and, depending on the period shift of the two merged clock signals clk2 and clk3, have, within a narrow range of tolerance, a fixed number of individual pulses per unit of time.

The first pulse count comparator unit PZVE1 of the first arithmetic unit R1 counts the number of individual pulses in the output signal clk23 of the second AND gate AND2 and compares the determined value with a further comparative value which has been stored in the first arithmetic unit R1, for example in a RAM memory. If the determined number of pulses in the output signal clk23 of the second AND gate AND2 deviates from this further comparative value, then in this case the first pulse count comparator unit PZVE1 activates the first resetter RES1 which outputs a reset signal sr1 via the first OR gate OR1 to the reset input RESET2 of the second arithmetic unit R2. By this means, the second arithmetic unit R2 is reset electrically by the first arithmetic unit R1.

In the embodiment shown in FIG. 1, the first resetter RES1 can also simultaneously forward a resetting signal sae1 via the third OR gate OR3 to the activating unit AE, by means of which the activating unit AE is also reset to its initial electrical status.

In the exemplary embodiment shown in FIG. 1, the method described previously for the resetting of the first arithmetic unit R1 and of the activating unit AE by the second resetter RES2 and for the renewed function ramp-up of the first arithmetic unit R1 and of the activating unit AE initiated as a result otherwise applies in a fully analogous manner to the resetting of the second arithmetic unit R2 and of the activating unit AE by the first resetter RES1 and to a renewed function ramp-up of these two functional units initiated as a result.

Correspondingly, a permanent deactivation of the first arithmetic unit R1 or of the activating unit AE of the occupant protection means is also displayed to the vehicle owner by a so-called airbag warning light in the vehicle dashboard.

In order further to increase certainty in the detection of possible malfunctions of the control device of the occupant protection means, additional functional monitoring of the first arithmetic unit R1 by the activating unit AE is implemented in the shown control unit according to the invention with the aid of a so-called first watchdog circuit WDS1:

The first arithmetic unit R1 outputs at periodic intervals a first watchdog signal wd1 to the activating unit AE. If the expected watchdog signal wd1 is not received by the watchdog signal input AE1, the activating unit AE outputs an arithmetic unit resetting signal sae from its signal output SAE to the second signal input both of the first OR unit OR1 and of the second OR unit OR2, by means of which both the first arithmetic unit R1 is reset via the first reset input RESET1 and the second arithmetic unit R2 is reset via the second reset input RESET2.

Alternatively, a circuit arrangement can also be used in which the signal output SAE of the activating unit AE is not connected to the second signal input of the first OR unit OR1. Consequently, the activating unit AE then outputs the arithmetic unit resetting signal sae only to the second signal input of the second OR unit OR2 so that in the event of a fault in the first watchdog circuit WDS1 only the first arithmetic unit R1 is reset via the first reset input RESET1.

In any case, possible additional faults in the first arithmetic unit R1, which can be seen from the output signal clk13 of the first AND gate AND1, can be detected by the first watchdog circuit WDS1.

In a manner analogous to that in which monitoring is carried out by means of the first watchdog circuit WDS1 in the case of the first arithmetic unit R1, in FIG. 1 the second arithmetic unit R2 is monitored from the activating unit AE by means of a second watchdog circuit WDS2 via a connection of the second watchdog output WD2 to a second watchdog input AE2 of the activating unit AE and with the help of a periodic watchdog signal wd2. By analogy with the first watchdog circuit WDS1, in the case of the second watchdog circuit WDS2 in FIG. 1, the activating unit AE resets in the event of an admissible watchdog signal wd2 both the second arithmetic unit R2 and the first arithmetic unit R1 by means of the arithmetic unit resetting signal sae.

Alternatively, however, a circuit arrangement is also feasible in which the signal output SAE of the activating unit AE is not, as shown in FIG. 1, connected to both OR gates OR1 and OR2 but only to the second signal input of the first OR unit OR1. Consequently, the activating unit AE then emits the arithmetic unit resetting signal sae only to the second signal input of the first OR unit OR1, so that in the event of a fault in the second watchdog circuit WDS2 only the second arithmetic unit R2 is reset via the second reset input RESET2.

The second watchdog circuit WDS2 can in this way also detect faults in the second arithmetic unit R2 which cannot be seen from the output signal clk23 of the second AND gate AND2.

In the case of single or multiple resetting of at least one of the two arithmetic units R1 or R2 by at least one of the two watchdog circuits WDS1 and WDS2, a warning light in the vehicle interior is activated as an indicator to the vehicle owner of a possible malfunction of the control unit for the occupant protection system.

As in the example shown in FIG. 1, the two watchdog circuits WDS1 and WDS2 can be used simultaneously. It is, however, equally possible for just one of the two watchdog circuits WDS1 or WDS2 to be provided within the control unit according to the invention, which watchdog circuit is, however, in each case configured such that it can reset at least one of the two arithmetic units R1 and R2 and optionally also the activating unit AE.

Figure 2:
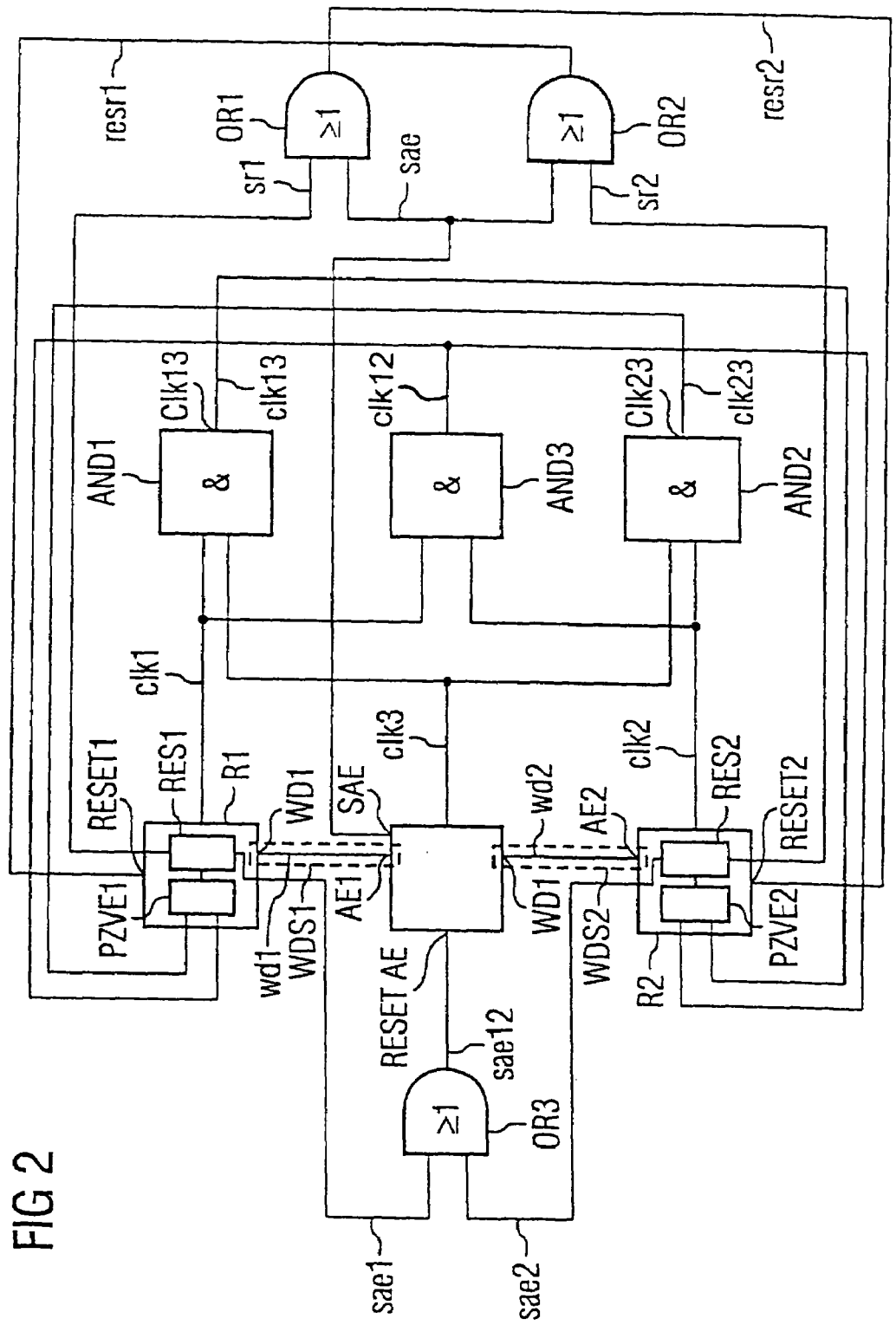
FIG. 2 shows a control unit according to the invention comprising three AND gates (AND1, AND2, AND3)

FIG. 2 shows the control unit according to the invention as shown in FIG. 1 but supplemented by a third AND gate AND3. The clock signals clk1 and clk2 of the first arithmetic unit R1 and of the second arithmetic unit R2 are fed on the input side to the third AND gate AND3. At the signal output of the third AND gate AND3 is a logical sum signal clk23 of the two clock signals clk1 and clk2 of the two arithmetic units R1 and R2 which is fed to a respective second signal input of the first pulse count comparator unit PZVE1 and of the second pulse count comparator unit PZVE2. The respective signal output of the first or second pulse count comparator unit PZVE1 or PZVE2 is connected to the first resetter RES1 or to the second resetter RES2.

A first output signal sr1 of the first resetter RES1 of the first arithmetic unit R1 is fed to an input of the first OR unit OR1. The signal output of the first OR unit OR1 is connected to the second reset input RESET2, as already explained further above. Analogously, a signal output sr2 of the second resetter RES2 of the second arithmetic unit R2 is connected to a signal input of the second OR gate OR2. The signal output of the second OR gate OR2 is connected to the first reset input RESET1 of the first arithmetic unit R1, as also already described further above.

The output signal of the third AND gate clk12 is evaluated in quite a similar manner to the two output signals of the two other AND gates AND1 and AND2:

The first pulse count comparator unit PZVE1 counts the number of pulses received in the output signal clk12 of the third AND gate AND3 and compares the number of pulses received per unit of time with a previously defined value which is stored for example in a RAM memory of the first arithmetic unit R1. If this value deviates from the stored value by more than a previously defined admissible maximum, then the first pulse count comparator unit PZVE1 activates the first resetter RES1 which resets the second arithmetic unit R1 indirectly via the first OR gate OR1.

The second pulse count comparator unit PZVE2 likewise determines the number of pulses received in the output signal clk12 of the third AND gate AND3 and releases, in the event of a number of individual pulses per unit of time being detected as being inadmissible, the activation of the second resetter RES2 which then resets the first arithmetic unit R1 indirectly via the second OR gate OR2.

In the exemplary embodiment in FIG. 2, a resetting of the activating unit AE can be initiated via the third OR gate OR3 simultaneously with the resetting of the first arithmetic unit R1 or of the second arithmetic unit R2.

Through addition of the third AND gate AND3, the arithmetic units R1 and R2 can consequently reset one another reciprocally if at least one of the clock signals of one of the two arithmetic units R1 or R2 is defective. In contrast to a resetting of at least one of the two arithmetic units R1 or R2 and optionally also of the activating unit AE on the basis of the signals clk13 and clk23 of the first AND gate AND1 and of the second AND gate AND2, a resetting of the arithmetic units R1 and R2 and preferably also of the activating unit AE can therefore be carried out by evaluating the output signal clk12 of the third AND gate AND3 completely independently of the clock signal clk3 of the activating unit AE.

FIG. 5 shows in summary a possible decision matrix according to which the two arithmetic units R1, R2 and the activating unit AE of the control unit according to the invention as per FIG. 2 can be reset:

A zero entered in the matrix signifies a proper functioning of the clock signals clk1, clk2, clk3 of the logical AND-combined clock signals clk13, clk12, clk23 and also a proper functioning of the first arithmetic unit R1, of the second arithmetic unit R2 and of the activating unit AE. An X entered in the decision matrix signifies by contrast a defective clock signal clk1, clk2, clk3 or a defectively composed clock signal clk13, clk12 and clk23, or a defective functioning of the first arithmetic unit R1, of the second arithmetic unit R2 or of the activating unit AE.

The arrows entered in the last three lines indicate with their points those arithmetic units R1 and R2 or the activating unit AE which is reset by the arithmetic unit R1 or R2 or by the activating unit AE at the starting point of the arrow.

The columns of the decision matrix in FIG. 5 should accordingly be read as follows:

In column 1, all the clock signals clk1, clk2, clk3, clk13, clk12 and clk23 are functioning properly since the arithmetic units involved R1, R2 and the activating unit AE are also operating properly.

A defective clock signal clk3 of the activating unit AE is entered in the second column. Consequently, the combined clock signals clk13 and clk23 are also defective. The properly functioning first arithmetic unit R1 as well as the properly functioning second arithmetic unit R2 reset in this case the faulty activating unit AE.

In the third column, the clock signal clk2 of the second arithmetic unit R2 is defective. Consequently, the clock signals clk12 and clk23 derived therefrom are also defective. In this constellation, the properly functioning first arithmetic unit R1 would reset the faulty arithmetic unit R2. While the activating unit AE is functioning perfectly in this case, it could, based on the circuit arrangement shown in FIG. 2, also be reset via the third AND gate by the first arithmetic unit R1.

In column 4, only the first arithmetic unit R1 is functioning properly and consequently resets the faulty second arithmetic unit R2 and the faulty activating unit AE.

Analogously, the properly functioning second arithmetic unit R2 in column 6 resets the faulty first arithmetic unit R1 and the faulty activating unit AE.

In column 5, in addition to the activating unit AE, the second arithmetic unit R2 is also functioning as provided. Since the detection of a defectively functioning first arithmetic unit R1 by the second arithmetic unit R2 is according to the invention available more quickly than the resetting function of the activating unit AE based upon the first watchdog circuit WDS1 from FIG. 1 or 2, the perfectly functioning second arithmetic unit R2 first resets the faulty first arithmetic unit R1 and only in a second step and indirectly via the third OR gate OR3 optionally also the activating unit AE.

Only the two special cases in columns 7 and 8 remain to be explained:

Column 7 shows the first special case of the decision matrix. Here, only the activating unit AE is operating to expectations. A resetting of the two arithmetic units R1 and R2 is therefore carried out on the basis of the two watchdog circuits WDS1 and WDS2 via which the activating unit AE can detect the malfunctioning of the two arithmetic units R1 and R2 and therefore outputs the reset signal sae to reset them.

In column 8, neither of the arithmetic units R1 or R2 is functioning properly, nor the activating unit AE. This fault in the control unit constitutes a threefold fault and is therefore very improbable. In this event, the behavior of the circuit cannot be predicted.

We claim:

1. A control unit for activating an occupant protection device in a motor vehicle, the control unit comprising:
   a first arithmetic unit supplying a clock signal and having a first pulse count comparator unit with an input and an output, a first resetter with an input and an output, and a reset input, said output of said first pulse count comparator unit being connected to said input of said first resetter;
   a second arithmetic unit supplying a clock signal and having a second pulse count comparator unit, a second resetter, and a reset input connected directly or indirectly to said output of said first resetter, said second pulse count comparator unit having an input and an output, said second resetter having an input connected to said output of said second pulse count comparator unit and said second resetter having an output connected directly or indirectly to said reset input of said first arithmetic unit;

an activating unit supplying a clock signal;

said first arithmetic unit, said second arithmetic unit and said activating unit being respectively clocked asynchronously relative to one another;

a first logical AND gate having an input side receiving both the clock signal of said first arithmetic unit and the clock signal of said activating unit and having an output feeding an output signal to said input of said second pulse count comparator unit;

a second logical AND gate having an input side receiving both the clock signal of said second arithmetic unit and the clock signal of said activating unit, said second logical AND gate having an output feeding an output signal to said input of said first pulse count comparator unit;

said first resetter resetting said second arithmetic unit by outputting a first reset signal if said first pulse count comparator unit detects an inadmissible number of pulses per unit of time in the output signal of said second AND gate; and said second resetter resetting said first arithmetic unit by outputting a second reset signal if said second pulse count comparator unit detects an inadmissible number of pulses per unit of time in the output signal of said first AND gate.

2. The control unit according to claim 1, which further comprises:

first and second logical OR gates;

said output of said second resetter being connected indirectly through said second OR gate to said reset input of said first arithmetic unit;

said output of said first resetter being connected indirectly through said first OR gate to said reset input of said second arithmetic unit;

said first resetter resetting said second arithmetic unit by outpulling a first reset signal indirectly through said first OR gate if said first pulse count comparator unit detects an inadmissible number of pulses per unit of time in the output signal of said second AND gate; and said second resetter resetting said first arithmetic unit by outpulling a second reset signal indirectly through said second OR gate if said second pulse count comparator unit detects an inadmissible number of pulses per unit of time in the output signal of said first AND gate.

3. The control unit according to claim 2, wherein:

said first arithmetic unit has a first watchdog output;

said activating unit has a watchdog input connected to said first watchdog output, and said activating unit has an arithmetic unit resetting output connected directly or indirectly through said second OR gate to said reset input of said first arithmetic unit; and said activating unit outputs an arithmetic unit resetting signal directly or indirectly through said second OR gate to said reset input of said first arithmetic unit if said activating unit receives an inadmissible watchdog signal from said first watchdog output.

4. The control unit according to claim 2, wherein:

said second arithmetic unit has a second watchdog output;

said activating unit has a signal input connected to said second watchdog output, and said activating unit has an arithmetic unit resetting output connected directly or indirectly through said first OR gate to said reset input of said second arithmetic unit; and said activating unit outputs an arithmetic unit resetting signal directly or indirectly through said first OR gate to said reset input of said second arithmetic unit if said activating unit receives an inadmissible second watchdog signal from said second watchdog output.

5. The control unit according to claim 1, wherein:

said activating unit has a reset input;

at least one of said first and second resetters is connected directly or indirectly to said reset input of said activating unit;

said first resetter resets said activating unit by outputting a first activator reset signal if said first pulse count comparator unit detects an inadmissible number of pulses per unit of time in the output signal of said second AND gate, and/or said second resetter resets said activating unit by outputting a second activator reset signal if said second pulse count comparator unit detects an inadmissible number of pulses per unit of time in the output signal of said first AND gate.

6. The control unit according to claim 1, which further comprises:

a third logical AND gate having an input side receiving the clock signal of said first arithmetic unit and the clock signal of said second arithmetic unit, said third logical AND gate supplying an output signal to both said input of said first pulse count comparator unit and said input of said second pulse count comparator unit;

said first resetter resetting said second arithmetic unit by outputting a first reset signal if said first pulse count comparator unit detects an inadmissible number of pulses per unit of time in the output signal of said third AND gate; and said second resetter resetting said first arithmetic unit by outputting a second reset signal if said second pulse count comparator unit detects an inadmissible number of pulses per unit of time in the output signal of said third AND gate.

7. A method for monitoring the proper functioning of a control unit, which comprises the following steps:

providing the control unit according to claim 1;

generating, with a first logical operation, a first combined signal from two respective clock signals of a first arithmetic unit and of an activating unit;

counting, with a second arithmetic unit, a number of pulses of the first combined signal during a time window;

comparing, with the second arithmetic unit, the number of pulses counted with a second reference value stored in a memory of the second arithmetic unit; and outputting a resetting signal, with the second arithmetic unit, to a first reset input of the first arithmetic unit if the number of pulses counted deviates by more than an admissible extent from the second reference value of the memory of the second arithmetic unit.

8. A method for monitoring the proper functioning of a control unit, which comprises the following steps:

generating, with a first logical operation, a first combined signal from two respective clock signals of a first arithmetic unit and of an activating unit;

counting, with a second arithmetic unit, a number of pulses of the first combined signal during a time window;

comparing, with the second arithmetic unit, the number of pulses counted with a second reference value stored in a memory of the second arithmetic unit; and outputting a resetting signal, with the second arithmetic unit, to a first reset input of the first arithmetic unit if the number of pulses counted deviates by more than an admissible extent from the second reference value of the memory of the second arithmetic unit.

9. The method according to claim 8, which further comprises:
generating, with a second logical operation, a second combined signal from two respective clock signals of the second arithmetic unit and of the activating unit;
counting, with the first arithmetic unit, a number of pulses of the second combined signal during a time window;
comparing, with the first arithmetic unit, the number of pulses counted with a first reference value stored in a memory of the first arithmetic unit; and
outputting a resetting signal, with the first arithmetic unit, to a second reset input of the second arithmetic unit if the number of pulses counted deviates by more than an admissible extent from the first reference value.

10. The method according to claim 9, which further comprises:
resetting the activating unit with the first arithmetic unit by outputting a first activator reset signal if the first arithmetic unit detects an inadmissible number of pulses per unit of time in the second combined signal;
and/or
resetting the activating unit with the second arithmetic unit by outputting a second activator reset signal if the second arithmetic unit detects an inadmissible number of pulses per unit of time in the first combined signal.

11. The method according to claim 10, which further comprises:
providing the control unit as part of an occupant protection system of a motor vehicle;
at least partially deactivating the occupant protection system with one of the two arithmetic units, after single or multiple resetting of the other of the two arithmetic units or of the activating unit;
and/or displaying malfunctions of the control unit and the at least partial deactivation of the occupant protection system to a vehicle occupant.

12. The method according to claim 9, which further comprises:
generating, with a third logical operation, a third combined signal from the two respective clock signals of the first arithmetic unit and of the second arithmetic unit;
counting a number of pulses of the third combined signal, during a time window, with both the first arithmetic unit and the second arithmetic unit;
comparing, with each of the first arithmetic unit and the second arithmetic unit, the number of pulses counted with a reference value stored in the memory of the first arithmetic unit or in the memory of the second arithmetic unit;
resetting the second arithmetic unit with the first arithmetic unit by outputting a first reset signal if the first arithmetic unit detects, by the comparison with the respective reference value, an inadmissible number of pulses per unit of time in the third combined signal; and
resetting the first arithmetic unit with the second arithmetic unit by outputting a second reset signal if the second arithmetic unit detects, by the comparison with the respective reference value, an inadmissible number of pulses per unit of time in the third combined signal.

13. The method according to claim 9, which further comprises:
feeding a first watchdog signal from a first watchdog output of the first arithmetic unit to a first watchdog input of the activating unit and thereupon outputting, from an arithmetic unit resetting output of the activating unit, an arithmetic unit resetting signal to the first reset input of the first arithmetic unit if the first watchdog signal is inadmissible;
and/or
feeding a second watchdog signal from a second watchdog output of the second arithmetic unit to a second watchdog input of the activating unit and thereupon outputting, from the arithmetic unit resetting output of the activating unit, the arithmetic unit resetting signal to the second reset input of the second arithmetic unit if the second watchdog signal is inadmissible.

* * * * *